Patented May 18, 1937

2,080,562

UNITED STATES PATENT OFFICE 2,080,562

PROCESS FOR THE PRODUCTION OF KETENE

Wolfram Eschenbach, Munich, Germany

No Drawing. Application February 18, 1933, Serial No. 657,459. In Germany February 26, 1932

3 Claims. (Cl. 260—123)

The invention relates to a process for the preparation of ketene by thermic splitting of acetone vapor which makes a practically quantitative yield of ketene possible without the occurrence of undesirable by-products.

Up to the present the preparation of ketene by thermic splitting of acetone was only carried out between 500° and 700° C. in the presence of metals and alloys such as e. g.: copper, silver, platinum, tungsten, brass, bronze or of non-metallic substances as clay fragments. These methods are not applicable in manufacturing as the highest yields amount to approximately 50% of the theoretical amount.

In accordance with this invention practically quantitative yields of ketene are obtained if the thermic splitting of acetone vapor is carried out at temperatures from about 450° C. to about 770° C. in the presence of carbon, or free carbon containing materials. It is not necessary to utilize carbon e. g. anthracite, graphite or similar substances, for the same result is obtained by producing the carbon in the reaction chamber in the absence of metals and metal oxides by precipitating it on a suitable substratum which should not be of metal. The formation of the carbon may be made from substances which on thermic dissociation yield free carbon such as methane, acetylene, carbon monoxide, alcohols, hydrocarbons, petroleum, etc. It is unimportant whether the carbon reacts chemically with the support or whether it only covers it in a superficial layer.

An undesirable precipitation of carbon can be removed by heating for a short time in the presence of air to oxidize the superfluous carbon.

After the conversion of the extremely reactive ketene the nearly chemically pure methane which occurs as by-product can be worked up to an excellent carbon black in such a manner that the heat evolved by the methane-combustion is simultaneously used for the evaporation of the acetone.

On account of the extraordinary activity of the carbon catalyzer in comparison with the methods of preparation of ketene used hitherto, the process according to the invention brings about a marked independence from adhering to certain fixed times of exposing the reaction mixture in the reaction chamber.

The following examples illustrate the application of the process:

Example I

In a reaction chamber supplied with an upper delivery and a bottom inlet tube, two platelike electrodes one above the other and insulated from each other, are connected in parallel with a current supply. The space between the electrodes is spanned by numerous filaments of carbonized vegetable fibre (cocoanut fibre as in an electric carbon incandescent lamp) in such a manner that the carbon fibres between the edges of the electrodes conduct electricity. It is advisable to have the two electrodes of different diameters with the smaller one underneath.

The acetone vapor is generated in an evaporating vessel and is conducted by the inlet tube through the bottom of the reaction chamber into the space between the two electrodes and compelled to pass between the carbon filaments which are heated to dark red heat. After the splitting up reaction is completed, the delivery tube situated above the upper electrode withdraws the gas mixture, consisting of methane, ketene and unchanged acetone into a powerful condenser where the acetone is immediately condensed and returned into the evaporator.

By regulating the velocity of the evaporation and by modifying the strength of the current i. e. the temperature of the incandescent fibres or by both manipulations simultaneously an extremely regular and constant flow of gas of constant composition is obtained.

The yield in ketene, referring to the amount of acetone converted amounts to 94% of theory.

Example II

A carbon tube filled with small pieces of retort carbon or coke is embedded in a tube of resistant material and slowly heated to 550°–700° C. inner temperature and at the same time the air is replaced by acetone vapour.

For the rest as in Example I.

Yield: 93% of theory and over.

Example III

In a cylindrical vessel supplied with an inlet and a delivery tube a silicon carbide rod, which it is advisable to cover with a thin layer of free carbon such as graphite, coke and the like, is electrically heated to a dark red and the air is replaced at the same time by acetone vapour. The evaporation velocity of the acetone is regulated in such a manner that the duration of splitting in the chamber or the time of presence of the mixture on the contact does not exceed 10 seconds.

Yield 94% of theory and over.

An increase of the diameter of the silicon carbide rod on account of precipitation of carbon after prolonged use or inadequate electric treatment can be remedied according to the directions given.

A silicon carbide tube with or without filling can be used with advantage by employing the inside of the tube as splitting chamber and the wall of the tube for heating. With the aid of this mechanism very good out-put can be obtained in a short time with a nearly quantitative yield of ketene.

The invention claimed is:

1. Process for the production of ketene consisting of conducting acetone vapor through a tube filled with a catalyst consisting of retort carbon heated to 550°–700° C., with-drawing the vapor mixture, cooling, condensing and separating the acetone.

2. Process for the production of ketene comprising bringing acetone vapor in contact with a catalyst consisting substantially of coke at a temperature above 450° C. and substantially below the temperature at which substantial quantities of acetone decompose into substances other than ketene.

3. Process for the production of ketene consisting of conducting acetone vapor through a tube filled with a catalyst consisting of carbon heated to 550°–700° C., withdrawing the vapor mixture, cooling, condensing and separating the acetone.

WOLFRAM ESCHENBACH.